United States Patent [19]

Flaman

[11] Patent Number: 5,502,753
[45] Date of Patent: Mar. 26, 1996

[54] INSTRUMENTATION PROBE

[76] Inventor: Michael T. Flaman, 20 Treeline Court, Etobicoke, Ontario, Canada, M9C 1K8

[21] Appl. No.: 314,121

[22] Filed: Sep. 29, 1994

Related U.S. Application Data

[62] Division of Ser. No. 948,443, Sep. 22, 1992, Pat. No. 5,365,554.

[51] Int. Cl.[6] .................................................. G21C 17/00
[52] U.S. Cl. ............................ 376/245; 376/246; 376/247
[58] Field of Search .................................. 376/245, 246, 376/247; 73/861, 861.37, 861.02, 861.33

[56] References Cited

U.S. PATENT DOCUMENTS

| | | | |
|---|---|---|---|
| 3,744,307 | 7/1973 | Harper et al. | 73/152 |
| 3,827,297 | 8/1974 | Grivervs | 73/194 C |
| 4,449,414 | 5/1984 | Coates | 73/861.37 |
| 4,522,063 | 6/1985 | Ver Nooy | 73/579 |
| 4,928,758 | 5/1990 | Siegfried, II | 166/66 |
| 5,251,479 | 10/1993 | Siegfried, II et al. | 73/155 |

Primary Examiner—Donald P. Walsh
Assistant Examiner—Meena Chelliah
Attorney, Agent, or Firm—Ridout & Maybee

[57] ABSTRACT

An instrumentation probe for measuring and recording one or more physical parameters within a fluid duct, such as a nuclear reactor fuel channel, comprises one or more sensors responsive to the parameters to be measured and recorded, each sensor actuating a scribe which cooperates with a recording chart. The recording chart is a drum, disc, tape or like recording device, and is volume driven at a constant speed by an impeller responsive to the fluid flow. No connections to external instrumentation are required.

4 Claims, 1 Drawing Sheet

5,502,753

INSTRUMENTATION PROBE

CROSS-REFERENCE TO RELATED APPLICATION

This application is a divisional of copending application Ser. No. 07/948,443, U.S. Pat. No. 5,365,554 filed on Sep. 22, 1992 and entitled INSTRUMENTATION PROBE.

FIELD OF THE INVENTION

The present invention relates to an instrumentation probe for use in the on-line measurement and recording of physical parameters within a fluid duct without connection to external instrumentation. A particular application of the instrumentation probe is to the measurement and recording of structural, thermal and hydraulic data within a fuel channel of a fluid-cooled nuclear reactor, and such data may include fuel channel coolant pressure, in-channel flow magnitudes and variations, fluid and pressure tube temperatures, pressure tube vibration, fuel bundle displacements, and the like. However, the invention is not exclusively concerned with nuclear applications, but is applicable to analogous systems in which physical parameters within a fluid duct are to be measured and recorded.

BACKGROUND OF THE INVENTION

In the case of fluid-cooled nuclear reactors, problems associated with fuel bundle damage have underlined the need to have a capability to obtain accurate measurement data directly from within any fuel channel during any phase of reactor operation. The inability to obtain structural integrity measurement data directly from locations within fuel channels during reactor operation has resulted in uncertainty as to quantifying activity within the fuel channels, such activity relating more particularly to the pressure tubes, coolant flow and fuel bundles. This uncertainty has in turn resulted in severe information constraints regarding structural and thermal-hydraulic concerns with fuel channels. In order to deal with these concerns, accurate on-line measurements within the fuel channels are required.

SUMMARY OF THE INVENTION

According to the present invention, there is provided an instrumentation probe for measuring and recording one or more physical parameters within a fluid duct, which may be a fuel channel of a nuclear reactor, although the invention in its broadest aspect is not limited to nuclear applications. The instrumentation probe basically comprises an elongate support frame adapted to be located within the fluid duct, and self-contained measuring and recording means mounted on the frame. The self-contained measuring and recording means comprises one or more sensors each responsive to a physical parameter to be measured and recorded, and a scribe coupled to the or each sensor, which scribe cooperates with a volume driven recording chart, such as a rotary drum, for recording variations in the respective physical parameter over time. The recording chart is driven by a longitudinally extending rotary shaft carrying an impeller which is responsive to fluid flow for rotating the shift at a constant speed, the shaft being coupled to the recording chart through a speed reducing mechanism.

In the case of a nuclear reactor application the fluid flow is itself maintained constant and so the constant speed of the recording chart is thereby maintained. In applications where the fluid flow is not constant it is necessary to govern the shaft rotation by any suitable speed governing device, or alternatively to apply markings to the recording chart at regular intervals of time so as to provide a time scale. It will be appreciated that, in the latter case, the chart will be driven at a speed which is effectively constant with respect to the time scale.

DESCRIPTION OF THE PREFERRED EMBODIMENT

Figure 1:
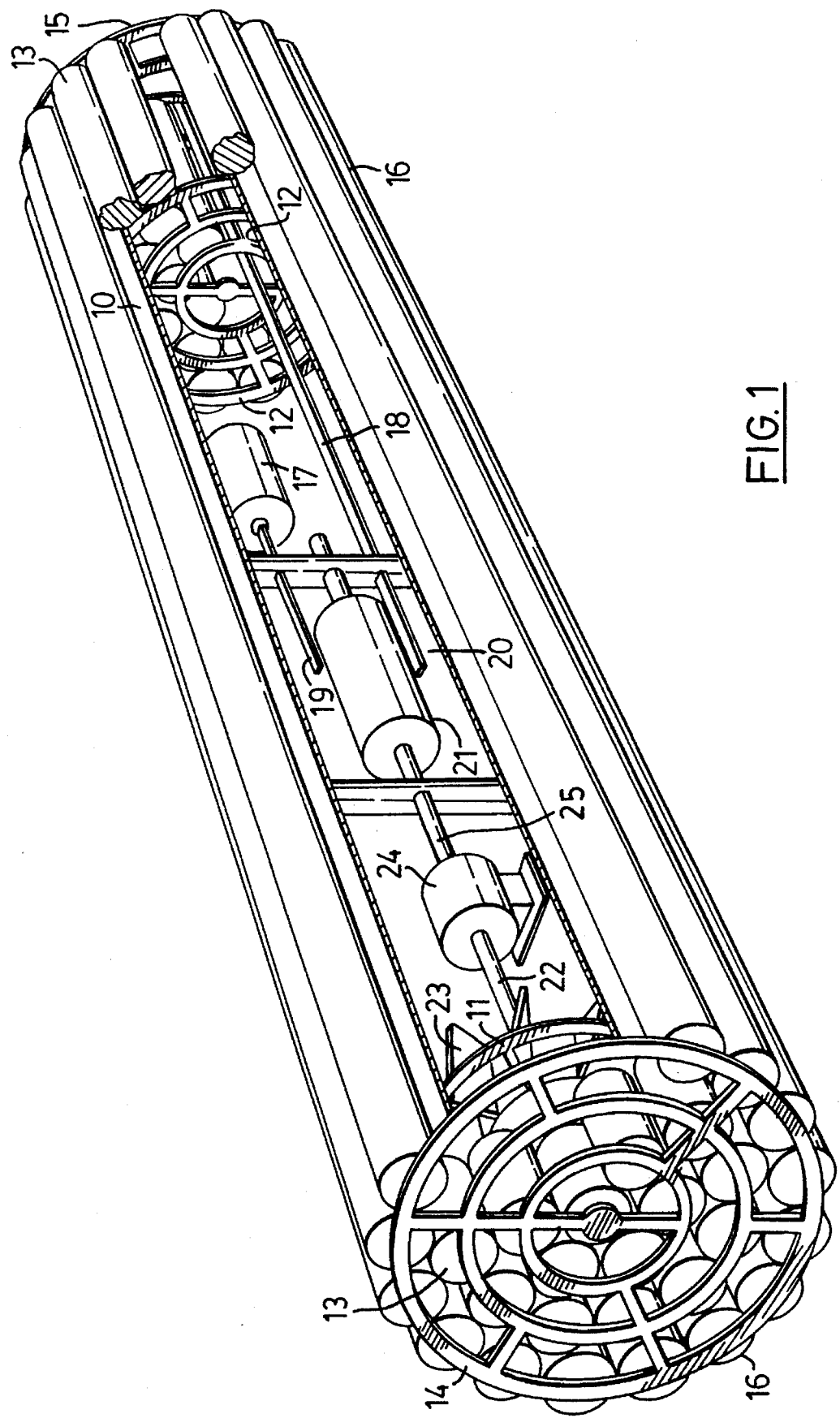

In order that the invention may be readily understood, a preferred embodiment thereof will now be described with reference to the single FIGURE of the accompanying drawing. The drawing shows a perspective view, partly broken away to show internal parts, of an instrumentation probe for use in the on-line measurement and recording of physical parameters within a nuclear reactor fuel channel.

The probe comprises a cage-like support structure 10 which houses and supports the instrumentation of the probe. The support structure 10 comprises a pair of circular perforate end plates 11, 12 with an array of fuel pencils made up of an outer ring of active fuel pencils 13 and an inner ring of dummy fuel pencils 14 extending longitudinally between the end plates 11, 12 and connected thereto at their ends. Thus the probe can be configured to simulate a fuel bundle of the reactor in which it is to be used.

The instrumentation includes sensors each of which is responsive to a physical parameter to be measured. In the illustrated device there is a mechanical pressure sensor 15 responsive to fluid pressure and an end plate displacement sensor 16, the latter being in the form of a rod which is connected to the end plate 12 and extends longitudinally therefrom. The instrumentation may include other sensors (not shown), each being responsive to a respective physical parameter to be recorded. Each sensor carries a scribe 17, 18, or equivalent writing device which cooperates with a recording device for recording the measurements of the parameters over time. In the illustrated embodiment of the invention the recording device is a rotary drum 19, but it may take any other suitable form such as a rotary disc or a travelling tape.

The drum 19 is driven at a constant speed to provide a time base. As shown, the device for rotating the drum 19 comprises a rotary shaft 20 carrying an impeller 21 which is responsive to the fluid flow along the fuel channel so as to rotate the shaft 20. The shaft 20 serves as the input shaft of a speed reducing mechanism 22, the latter having an output shaft 23 on which the rotary drum 19 is mounted. Since the fluid flow in the reactor fuel channel is normally held constant, the drum 19 is rotated at a constant speed. In certain applications, however, where the fluid flow may not be constant, the speed of the drum can be kept constant simply by governing the speed of the impeller to the speed corresponding to the lowest flow rate expected.

In order to clarify the structure of the probe and to show essential components, certain elements have been omitted from the drawing. In particular, a part of the inner and outer rings of fuel pencils has been omitted to reveal the instrumentation. The sensors, scribes, recording drum and gear reducing mechanism are conventional, and are supported within the cage-like support structure by means not shown. The drum 19 and the speed reducing mechanism 22, which may be 35 a gear reduction train, are arranged coaxially within the cage, one end of the rotary shaft 20 being journalled in a bearing 24 mounted centrally on the end plate 11.

I claim:

1. An instrumentation probe for use in the on-line measurement and recording one or more physical parameters within a fluid duct without connection to external instrumentation, comprising an elongate support frame for being mounted within the fluid duct, and measuring and recording means mounted on the frame, said measuring and recording means comprising:

at least one sensor responsive to a physical parameter to be measured and recorded, scribe means coupled to said at least one sensor for recording a measurement of said physical parameter, a volume driven recording chart, and means for driving the recording chart comprising a longitudinally extending rotary shaft carrying an impeller responsive to fluid flow through the duct for rotating the shaft at a measurable speed, said shaft being coupled to the recording chart through a speed reducing mechanism for driving the chart at said measurable speed, wherein said scribe and said recording chart are mounted in said frame such that said scribe records variations in said physical parameter over time on said recording chart.

2. An instrumentation probe according to claim 1, wherein said measurable speed is a constant speed.

3. An instrumentation probe according to claim 1, wherein the speed reducing mechanism is a gear reduction train having an input shaft and an output shaft, the recording chart comprising a rotary drum mounted on the output shaft.

4. An instrumentation probe according to claim 1, wherein the support frame is configured as a cylindrical cage having perforate end plates.

* * * * *